United States Patent
Wilds et al.

(10) Patent No.: US 11,635,746 B2
(45) Date of Patent: Apr. 25, 2023

(54) SYSTEM AND METHOD FOR AUTHENTICATING PHYSICAL OBJECTS WITH RANDOMIZED EMBEDDED INFORMATION

(71) Applicant: Raytheon Company, Waltham, MA (US)

(72) Inventors: Andrew M. Wilds, Sahuarita, AZ (US); Craig O. Shott, Tucson, AZ (US); Ryan D. White, Olathe, KS (US)

(73) Assignee: Raytheon Company, Waltham, MA (US)

( * ) Notice: Subject to any disclaimer, the term of this patent is extended or adjusted under 35 U.S.C. 154(b) by 370 days.

(21) Appl. No.: 16/829,501

(22) Filed: Mar. 25, 2020

(65) Prior Publication Data

US 2021/0302936 A1 Sep. 30, 2021

(51) Int. Cl.
*G05B 19/40* (2006.01)
*G05B 19/4099* (2006.01)
(Continued)

(52) U.S. Cl.
CPC ........ *G05B 19/4099* (2013.01); *B29C 64/118* (2017.08); *B29C 64/386* (2017.08);
(Continued)

(58) Field of Classification Search
CPC ..... B29C 64/118; B29C 64/386; B29C 70/88; B33Y 10/00; B33Y 70/10; B33Y 50/00; B33Y 80/00
See application file for complete search history.

(56) References Cited

U.S. PATENT DOCUMENTS

| 5,492,572 A | 2/1996 | Schroeder |
| 5,545,367 A | 8/1996 | Bae |

(Continued)

FOREIGN PATENT DOCUMENTS

| EP | 2565022 B1 | 12/2019 |
| WO | 03/017192 | 2/2003 |

(Continued)

OTHER PUBLICATIONS

Buren, Alec; "Revolutionary 3D printed magnets by Polymagnet can change engineering as we know it"; 3ders.org; Mar. 24, 2016; [online] <URL: https://www.3ders.org/articles/20160324-revolutionary-3d-printed-magnets-by-correlated-magnetics-can-change-engineering.html>; made available Jun. 29, 2017.

(Continued)

*Primary Examiner* — Joseph S Del Sole
*Assistant Examiner* — Jamel M Nelson
(74) *Attorney, Agent, or Firm* — Renner, Otto, Boisselle & Sklar, LLP

(57) ABSTRACT

A system and method for authenticating a physical object. The method may include the steps of: (1) encoding a feed material with randomized information; (2) forming the object with the feed material such that one or more portions of the object have respective randomized signatures based upon at least some of the randomized information of the feed material; (3) reading the respective randomized signatures at the one or portions of the object; (4) creating a profile of the respective randomized signatures at the one or more portions of the object based upon information from the reading; (5) transporting the physical object to an authenticator, and transmitting the profile to the authenticator; (6) reading the respective randomized signatures at the one or more portions of the object by the authenticator; and (7) comparing the (Continued)

reading by the authenticator to the profile received by the authenticator to thereby authenticate the physical object.

12 Claims, 7 Drawing Sheets

(51) Int. Cl.

| | | |
|---|---|---|
| *B33Y 10/00* | (2015.01) | |
| *B33Y 50/00* | (2015.01) | |
| *B33Y 80/00* | (2015.01) | |
| *B29C 64/118* | (2017.01) | |
| *B29C 64/386* | (2017.01) | |
| *B33Y 70/10* | (2020.01) | |
| *B29C 70/88* | (2006.01) | |
| *G06K 19/06* | (2006.01) | |
| *H01F 41/16* | (2006.01) | |
| *B33Y 30/00* | (2015.01) | |
| *B29K 505/00* | (2006.01) | |

(52) U.S. Cl.
CPC .............. *B29C 70/88* (2013.01); *B33Y 10/00* (2014.12); *B33Y 50/00* (2014.12); *B33Y 70/10* (2020.01); *B33Y 80/00* (2014.12); *G06K 19/06* (2013.01); *H01F 41/16* (2013.01); *B29K 2505/00* (2013.01); *B29K 2995/0008* (2013.01); *B33Y 30/00* (2014.12); *G05B 2219/34456* (2013.01); *G05B 2219/49007* (2013.01)

(56) References Cited

U.S. PATENT DOCUMENTS

| | | | |
|---|---|---|---|
| 5,631,093 | A | 5/1997 | Perry |
| 6,029,895 | A | 2/2000 | Ito |
| 6,053,406 | A | 4/2000 | Litman |
| 9,552,542 | B2 | 1/2017 | Boday |
| 9,623,604 | B2 | 4/2017 | Glazberg |
| 2002/0081461 | A1 | 6/2002 | Nishikawa |
| 2004/0178274 | A1 | 9/2004 | Wu |
| 2015/0321420 | A1 | 11/2015 | Karpas |
| 2016/0031157 | A1 | 2/2016 | Reep |
| 2016/0375492 | A1 | 12/2016 | Bencher |
| 2017/0136699 | A1 | 5/2017 | Erb |
| 2017/0220835 | A1 | 8/2017 | Glazberg |
| 2019/0139909 | A1 | 5/2019 | Bush |
| 2020/0298493 | A1* | 9/2020 | Wilds ................ B33Y 30/00 |

FOREIGN PATENT DOCUMENTS

| | | |
|---|---|---|
| WO | 2015188175 A1 | 12/2015 |
| WO | 2016097911 A1 | 6/2016 |
| WO | 2016209823 A1 | 12/2016 |
| WO | 2017100271 A1 | 6/2017 |
| WO | 2019050922 A1 | 3/2019 |

OTHER PUBLICATIONS

Hipolite, Whitney; "Magic of Magnets: You Can Now 3D Print Your Own Anti-Gravitator to Amaze Your Friends"; 3Dprint.com, 3DR Holdings, LLC; Jul. 29, 2015; [online] <URL: https://3dprint.com/85325/3d-printed-anti-gravitator/>; made available Jun. 29, 2017.

Jackson, Beau; "3D Printing Harnesses the Power of Magnets"; 3D Printing Industry; Oct. 25, 2016; [online] <URL: https://3dprintingindustry.com/news/3d-printing-harnesses-power-magnets-97395/>; made available Jun. 29, 2017.

Koslow, Tyler; "Polymagnets: Showing Us the Possibility of 3D Printing Magnetic Fields"; 3D Printing Industry; Mar. 24, 2016; [online] <URL: https://3dprintingindustry.com/news/polymagnets-showing-us-the-possibility-of-3d-printing-magnetic-fields-75254/>; made available Jun. 29, 2017.

Polymagnet, Correlated Magnetics; "About Polymagnets"; [online] <URL: http://www.polymagnet.com/polymagnets/> made available Jun. 29, 2017.

Rubee, Viable Assets, Inc.; [online] <URL: https://www.ru-bee.com/> made available Jun. 29, 2017.

Scott, Clare; "ORNL Researchers 3D Print Permanent Magnets for Clean Energy Applications, Saving Time, Cost and Material"; 3Dprint.com, 3DR Holdings, LLC; Nov. 2, 2016; [online] <URL: https://3dprint.com/154219/ornl-3d-printed-magnets-baam/>; made available Jun. 29, 2017.

Szielasko, Klaus et al.; "Fingerprint signatures based on nanomagnets as markers in materials for tracing and counterfeit protection"; May 12, 2016; Journal of Nanoparticle Research vol. 18, issue 5.

Wikipedia, Wikimedia Foundation, Inc.; "RuBee"; [online] <URL: https://en.wikipedia.org/wiki/RuBee> made available Jun. 29, 2017.

International Search Report and Written Opinion dated May 11, 2021 in corresponding International Application No. PCT/US2021/012480.

\* cited by examiner

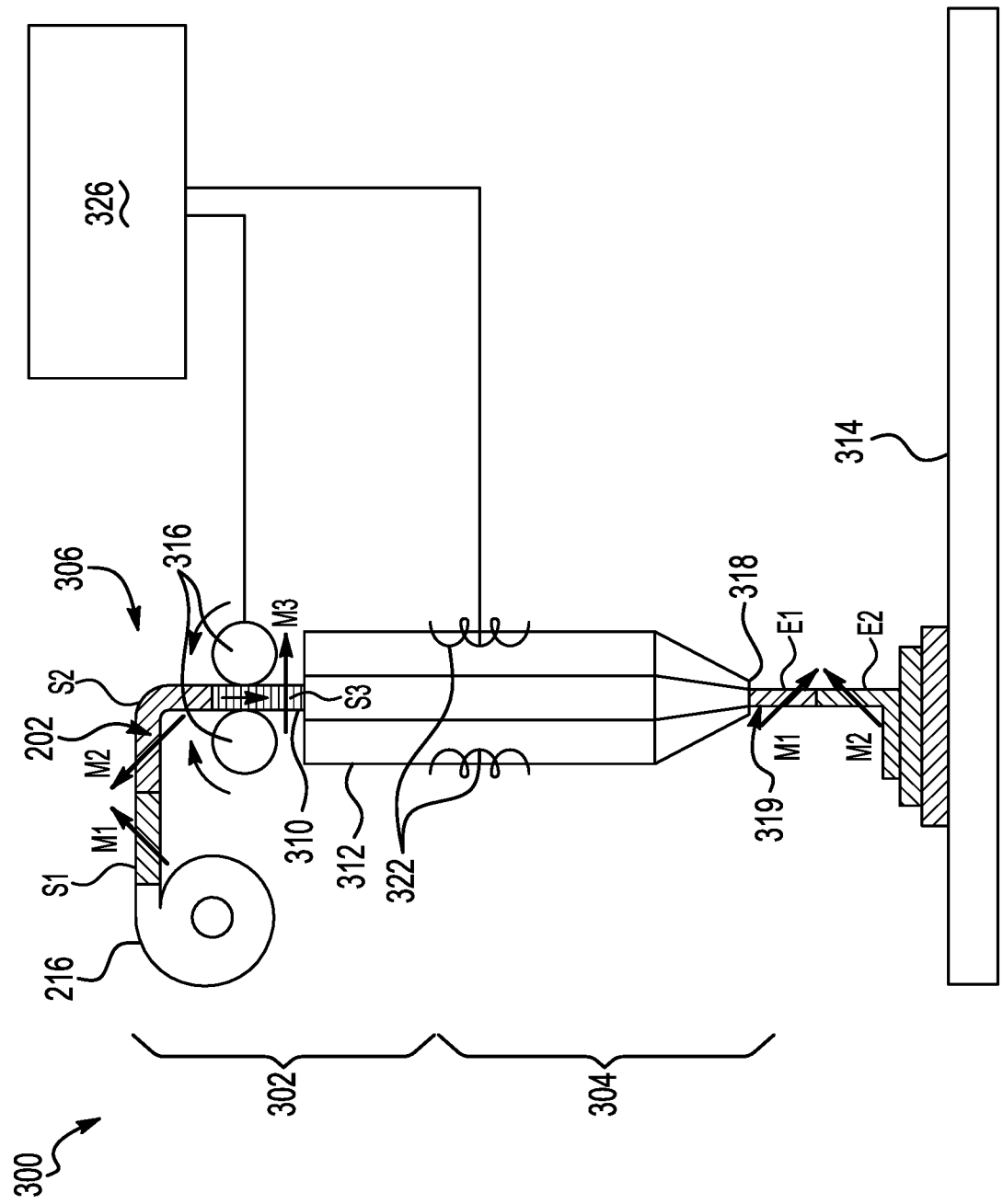

SYSTEM AND METHOD FOR AUTHENTICATING PHYSICAL OBJECTS WITH RANDOMIZED EMBEDDED INFORMATION

TECHNICAL FIELD

The present invention relates generally to authentication, and more particularly to a system and method for authenticating physical objects using randomized information encoded in the feed material that forms such object.

BACKGROUND

There is an ongoing demand for effective anti-counterfeiting technologies. Counterfeiting of mechanical parts and goods in general poses a risk to many businesses. Some conventional anti-counterfeiting technologies depend on visual markers that are difficult to replicate or identify. Data encoding is another technique for adding a representation of information into an object. For example, a unique identification can be added to the object by printing a barcode encoding a unique number corresponding to the object. Another example of data embedding involves quick response (QR) codes, which provide machine-readable codes that are visible and may be used to convey information such as uniform resource locators.

SUMMARY

An aspect of the present disclosure provides a unique system and method for the authentication of a physical object using randomized information embedded in the object.

More particularly, according to an aspect, the system and method includes encoding randomized information into a feed material, and then additively manufacturing the object with the feed material such that one or more portions of the object exhibit randomized signatures based upon at least some of the randomized information of the feed material.

In exemplary embodiments, the randomized information in the feed material includes randomized magnetic characteristics encoded at different portions of the feed material. Accordingly, the respective randomized signatures of the object may include respective randomized magnetic signatures based upon at least some of the randomized magnetic characteristics of the feed material.

According to further aspect(s), after the object has been additively manufactured, a profile of the randomized signatures may be created by reading the one or more portions of the object. The object may be transported to an authenticator (e.g., third-party) and the profile is transmitted to the authenticator for authentication of the object. The authenticator may read the randomized signatures at the one or more portions of the object and compare their reading to the transmitted profile to determine if there is a match. If a match is found, the object is authenticated. If a match is not found, the object is not authenticated, which may be indicative of tampering or counterfeiting of the object.

According to an aspect of the present disclosure, a method of producing an authenticatable physical object includes: providing a feed material encoded with randomized information; and additively manufacturing the physical object with the feed material such that one or more portions of the physical object have respective randomized signatures based upon at least some of the randomized information of the feed material.

According to an embodiment of any paragraph(s) of this summary, the randomized information includes randomized magnetic characteristics encoded at different portions of the feed material; and the respective randomized signatures at the one or more portions of the physical object include respective randomized magnetic signatures based upon at least some of the randomized magnetic characteristics of the feed material.

According to an embodiment of any paragraph(s) of this summary, the feed material is a filament.

According to an embodiment of any paragraph(s) of this summary, the filament includes a magnetized material.

According to an embodiment of any paragraph(s) of this summary, the magnetized material is included along a length of the filament, and wherein the magnetized material at respective different portions along the length of the filament have randomized magnetic field directions and/or intensities.

According to an embodiment of any paragraph(s) of this summary, the filament includes base material that contains the magnetized material therein.

According to an embodiment of any paragraph(s) of this summary, the base material includes a thermoplastic, and wherein the magnetized material includes metal particles dispersed within the thermoplastic.

According to an embodiment of any paragraph(s) of this summary, the additive manufacturing includes depositing the feed material while maintaining at least some of the randomized information.

According to an embodiment of any paragraph(s) of this summary, the additive manufacturing includes heating the feed material to a heated temperature before the depositing.

According to an embodiment of any paragraph(s) of this summary, the heated temperature is above a glass transition temperature of a base material of the feed material, and is below a Curie temperature of magnetized material in the base material that is encoded with randomized magnetic characteristics.

According to an embodiment of any paragraph(s) of this summary, during at least some of the additive manufacturing, the heating is increased such that the heated temperature is above the Curie temperature of the magnetized material to thereby cause the magnetized material to lose the randomized magnetic characteristics, such that one or more portions of the physical object are intentionally devoid of a magnetic signature.

According to an embodiment of any paragraph(s) of this summary, the additive manufacturing includes fused filament fabrication, including the steps: conveying the feed material with an actuator to an extruder, heating the feed material in the extruder, extruding the feed material through a nozzle of the extruder, and depositing the feed material on a substrate.

According to an embodiment of any paragraph(s) of this summary, the physical object as a whole formed by the additive manufacturing has a net zero magnetic field.

According to another aspect, a method of encoding a feed material with randomized information includes: subjecting the feed material to an external magnetic field, wherein the subjecting includes randomly orienting the direction of the magnetic field and/or randomly altering the intensity of the magnetic field to thereby impart a randomized magnetic characteristic at different portions in the feed material; wherein the feed material is used in the method for producing an authenticatable physical object according to any paragraph(s) of this summary.

According to an embodiment of any paragraph(s) of this summary, the feed material includes a base material having metallic particles contained therein, and wherein the subjecting the feed material to the external magnetic field causes the respective metallic particles to form permanent magnetic characteristics corresponding to the direction of the magnetic field and in proportion to the intensity of the magnetic field.

According to another aspect, a method for authenticating a physical object includes: providing the physical object in which one or more portions of the physical object have respective randomized magnetic signatures; reading at least some of the respective randomized magnetic signatures at the one or portions of the object; and creating a profile of at least some of the respective randomized magnetic signatures at the one or more portions of the object based upon at least some of the information from the reading.

According to an embodiment of any paragraph(s) of this summary, the reading includes using a magnetometer to determine respective magnetic characteristics of the respective randomized magnetic signatures, the respective magnetic characteristics including magnetic orientation and/or intensity; and wherein the profile includes information corresponding to a location of the reading and the magnetic characteristics at the location.

According to another aspect, a method of authenticating a physical object includes: encoding a feed material with randomized information; additively manufacturing the physical object according to the method for producing an authenticatable physical object according to any paragraph(s) of this summary; reading the respective randomized signatures at the one or portions of the object; creating a profile of the respective randomized signatures at the one or more portions of the object based upon information from the reading; transporting the physical object to an authenticator, and transmitting the profile to the authenticator; reading the respective randomized signatures at the one or more portions of the object by the authenticator; and comparing the reading by the authenticator to the profile received by the authenticator to thereby authenticate the physical object.

According to another aspect, a system for forming an authenticatable physical object includes: an additive manufacturing apparatus and a supply of feed material, wherein: the feed material is encoded with randomized information in the form of randomized magnetic characteristics at different portions of the feed material, and the additive manufacturing apparatus is configured to form the physical object with the feed material such that one or more portions of the physical object have respective randomized magnetic signatures based upon at least some of the randomized magnetic characteristics of the feed material.

According to an embodiment of any paragraph(s) of this summary, the feed material is a filament having a thermoplastic base and magnetized particles dispersed within the thermoplastic base, the magnetized particles having randomized magnetic vector orientations and/or randomized magnetic vector intensities at the different portions of the feed material; and the additive manufacturing apparatus includes: an extruder having an inlet and an outlet, an actuator configured to convey the feed material into the inlet of the extruder, a heater in thermal communication with the extruder, the heater being configured to heat the feed material to a flowable state in the extruder, and a build platform configured to receive the feed material from the outlet of the extruder.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 5 is a schematic illustration of an exemplary additive manufacturing system according to an embodiment of the present disclosure.

DETAILED DESCRIPTION

The principles and aspects according to the present disclosure have particular application to a system and method for the authentication of physical objects by "3D printing" or "Additive Manufacturing" (AM) such objects, such as by fused filament fabrication (FFF) with a filament material that is encoded with randomized information, and thus will be described below chiefly in this context. It is understood, however, that the principles and aspects according to the present disclosure may be used with other materials and/or other processes, including other types of AM processes, where desirable.

Figure 1:
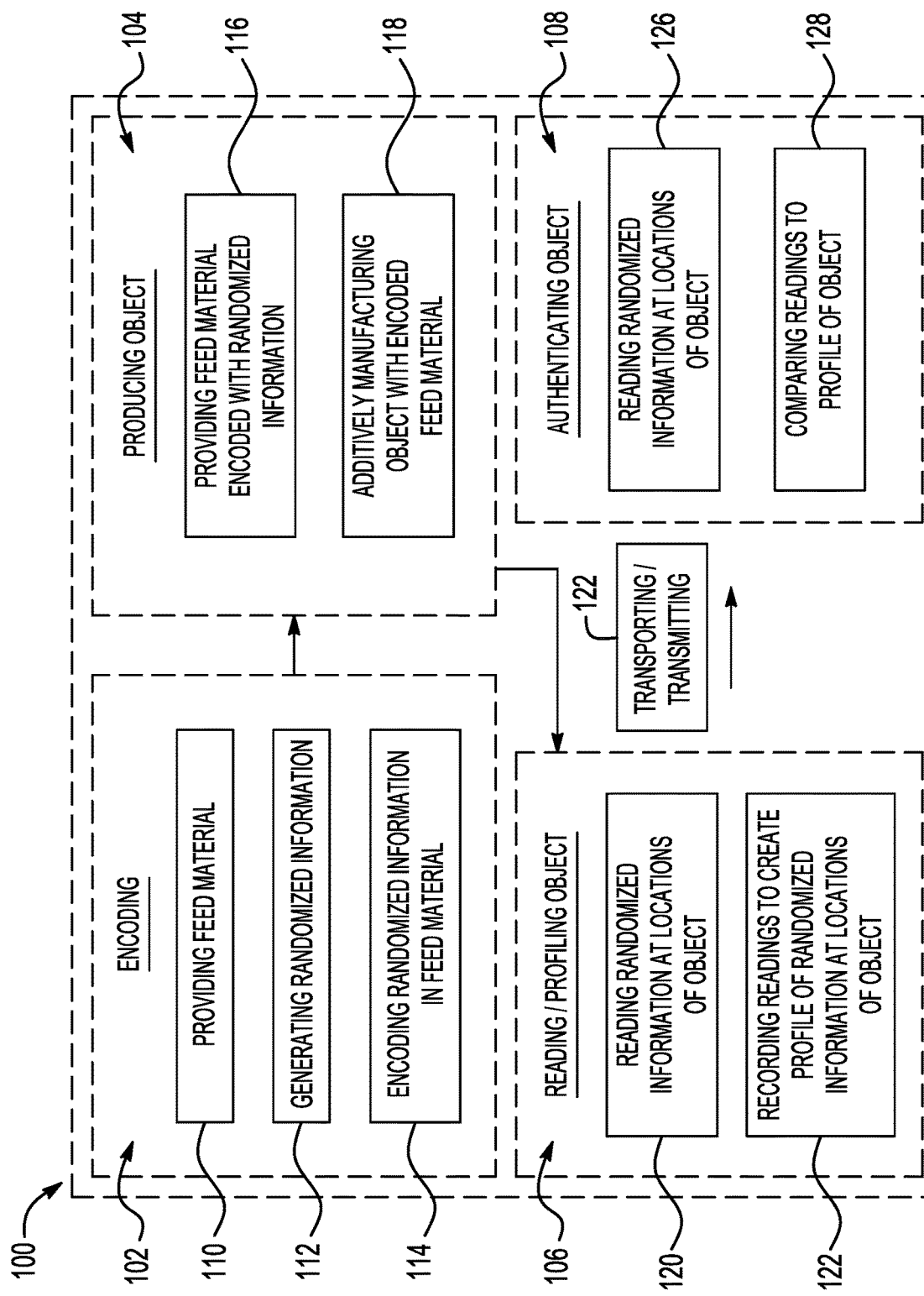
FIG. 1 is a flow diagram illustrating an exemplary method for authenticating a physical object according to an embodiment of the present disclosure.

Referring to FIG. 1, an exemplary method 100 of encoding a physical object is shown. The method generally includes the steps of: (1) encoding a feed material with randomized information (step 102); (2) forming a physical object with the feed material (step 104); (3) reading randomized signatures from the object and creating a profile (step 106); and authenticating the object (step 108).

More particularly, as shown in the illustrated embodiment, the encoding step 102 may include the steps of: providing a feed material (step 110); generating randomized information (step 112) such as by a magnetic field direction and/or intensity; and encoding the randomized information in the feed material (step 114).

The step of forming the physical object with the feed material (step 104) may include: providing the feed material encoded with the randomized information (step 116); and additively manufacturing the physical object with the feed material encoded with the randomized information (step 118), such that one or more portions of the physical object have respective randomized signatures based upon at least some of the randomized information of the feed material.

The step of reading randomized signatures from the object and creating a profile (step 106) may include: reading the respective randomized signatures at the one or portions of the object (step 120); and creating a profile of the respective randomized signatures at the one or more portions of the object based upon information from the reading (step 122), such as by recording the readings.

After producing the object (step 104) and creating the profile (step 120), the object may be transported to an authenticator (e.g., third-party) at step 124, who may be a distributor or end user of the object, for example. At or around step 124, the profile data created in step 122 is transmitted to the authenticator.

The step of authenticating the object (step 108), may include: reading the respective randomized signatures at the one or more portions of the object by the authenticator (step 126); and comparing the reading by the authenticator to the profile received by the authenticator to thereby authenticate the physical object (step 128).

Figure 2:
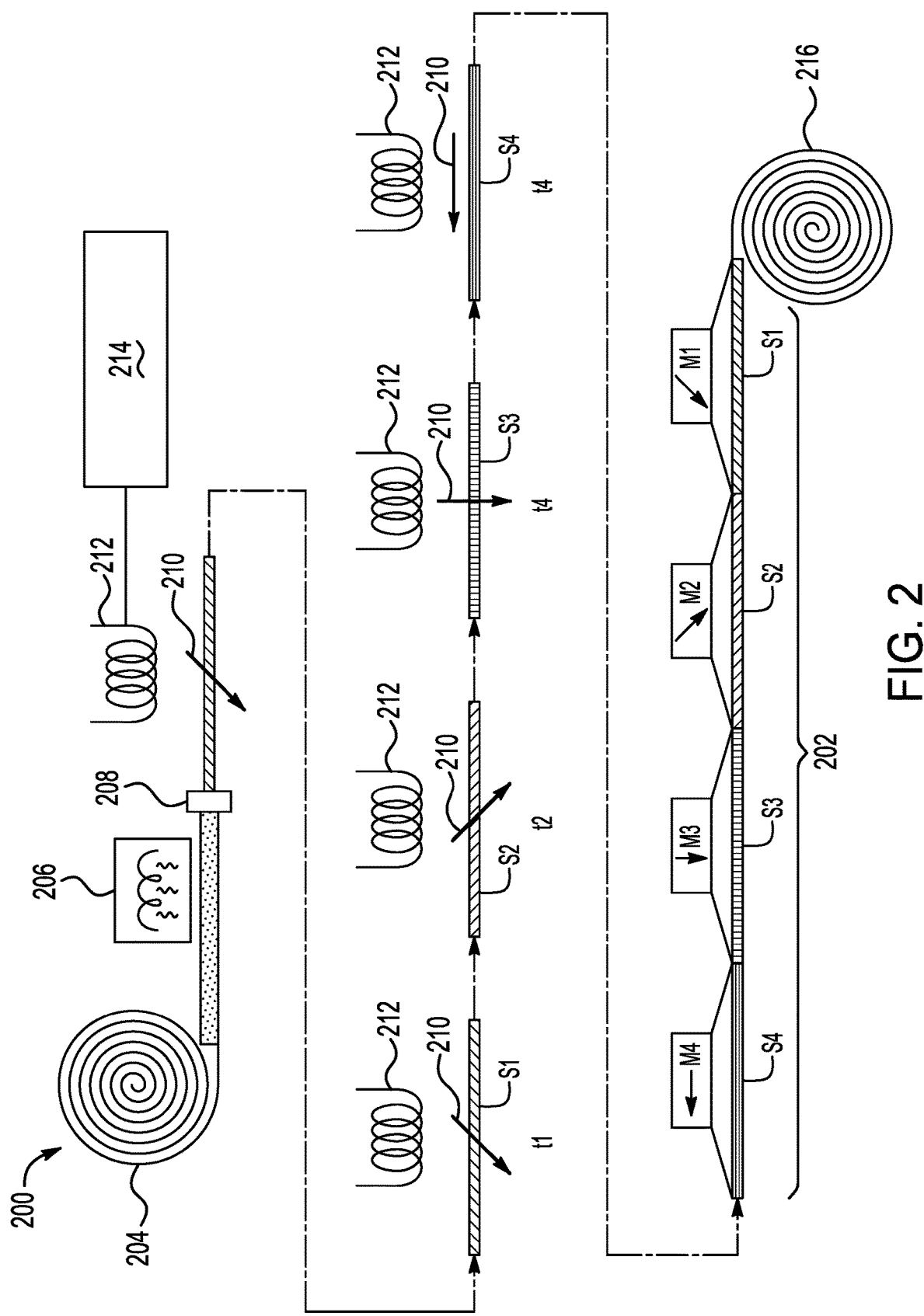
FIG. 2 is a schematic illustration of an exemplary process for encoding a feed material with randomized information according to an embodiment of the present disclosure.

Referring to FIG. 2 and step 102 in FIG. 1, an exemplary process 200 of encoding the feed material 202 with randomized information is shown in further detail. In the illustrated embodiment, the feed material 202 is a filament and the method of randomized encoding includes randomly varying a direction and/or intensity of a magnetic field applied to different segments of the feed material.

The process 200 may begin by providing a raw material 204 that is transformed into the feed material 202 used for additive manufacturing (step 118) by any suitable process. There are various types of such feed materials 202 that may be utilized in additive manufacturing processes. Common among these materials are thermoplastics, which are often used in fused-filament fabrication additive manufacturing. Thermoplastics remain solid until the processing temperature is raised above the glass transition temperature (Tg) at which point they will start to flow, and can be extruded via the additive manufacturing apparatus (described below). Different materials will have different Tg, and also may cool at a different rates. Some suitable thermoplastics for additive manufacturing may include one or more of an acid-, base- or water-soluble polymer, such as acrylonitrile-butadiene-styrene terpolymer (ABS), polycarbonate (PC), poly(meth)acrylate, polyphenylene sulfone (PPSU), polyethylene (PE), high-density polyethylene (HDPE), polyetherimide (PEI), polyetheretherketone (PEEK), polylactic acid (PLA), epoxy, phenolic, or other such polymers. In the various exemplary embodiments discussed herein, the focus will be on ABS and PLA because their properties are well-suited for the application of magnetic encoding during additive manufacturing.

In the illustrated embodiment, the raw material 204 is a thermoplastic-based filament (e.g., ABS or PLA) that may be provided in a roll or any other suitable form. As shown, the filament of raw material 204 may be heated via a heater 206 to a temperature below the glass transition temperature (Tg) to soften the material. The softened material may then be drawn through a die 208 to reduce the diameter of the material in a well-known manner for use in an additive manufacturing process.

In exemplary embodiments, the raw material 204 includes magnetic or magnetizable material that will exhibit a magnetic characteristic based upon encoding such material with a magnetic field 210 via a magnetic field generator 212. For example, in the illustrated embodiment where the raw material filament 204 is a thermoplastic-based material, the thermoplastic base contains metallic material, such as metal particles, which have configurable magnetic characteristics in response to the applied external magnetic field 210. Exemplary types of magnetic or magnetizable material are described in further detail below. Such mechanism of configuring the magnetic characteristics of the metallic material via the applied external magnetic field 210 also is described in further detail below. In a conventional manner, the raw material 204 and thus the feed material 202 may include other additives or fillers (e.g., plasticizers, elastomers, natural or synthetic materials, etc.) in a conventional manner.

In exemplary embodiments, the magnetic field generator 212 is a strong magnet or electromagnetic coil (shown in the illustrated embodiment). The magnetic field generator 212 (optionally in combination with a controller 214 or processor) may be considered the encoder of the exemplary system that encodes the information in the feed material 202. In exemplary embodiments, the magnetic field generator 212 may be a multi-axis magnetic field generator to provide the magnetic field 210 in the many different directions. For example, one or more actuators may be operably coupled to the magnetic field generator 212 to enable such multi-axis functionality. The magnetic field generator 212 (e.g., electromagnetic coil) also may be capable of varying the intensity of the magnetic field 210 such as by adjusting power to the coils.

As shown in the illustrated embodiment, the controller 214 is operably coupled to the magnetic field generator 212. In the illustrated embodiment, the controller 214 is configured to generate randomized magnetic field information (step 112) for controlling the magnetic field generator 212 according to this randomized information. For example, based upon the randomized information generated by the controller 214, the controller 214 controls the generator 212 to generate a randomized direction and/or intensity of the magnetic field 210.

As shown in FIG. 2, the randomized magnetic field 210 generated by the magnetic field generator 212 is applied to different segments S1, S2, S3, S4 of the feed material 202 at respective different time intervals t1, t2, t3, t4 as the feed material 202 is drawn through the magnetic field 212. At these different time intervals (t1, t2, t2, t4 . . . ) the magnetic field generator 212 generates the randomized magnetic field 210 with a random magnetic vector direction and/or random magnetic vector intensity. In this manner, the magnet field generator 212 encodes a permanent and randomized magnetic characteristic M1, M2, M3, M4 into the corresponding segments S1, S2, S3, S4 of the feed material 202 in response to the exposure to the magnetic field 210 in these various directions and/or intensities while the material 202 is being moved through the magnetic field 210.

As discussed above, in exemplary embodiments the feed material 202 is a non-metallic base material (e.g., thermoplastic) having magnetic or magnetizable material dispersed or embedded within the non-metallic matrix, in which the magnetic characteristics of this embedded material is configurable in response to the direction and/or intensity of the external magnetic field 210. Generally, the feed material 202 may be defined by a plurality of spatial units, and at least some of the spatial units correspond to the different spatial segments S1, S2, S3, S4 (collectively referred to as segments S) of the feed material 202 having the different magnetic characteristics M1, M2, M3, M4 (collectively referred to as magnetic characteristics M) that represent the randomized encoded information in the feed material.

In exemplary embodiments, each of the spatial segments S of the feed material 202 include one or more volume units (voxels) of the material. Generally, the voxel may be considered the smallest container for information which may hold one or more scaler values depending on the characteristics being measured. In exemplary embodiments, each voxel of the feed material 202 may include at least one magnetic domain capable of being configured in response to exposure to the magnetic field 210. For example, when the feed material 202 is formed from a non-metallic base material (e.g., thermoplastic), the at least one magnetic domain may part of the metallic particle contained in the non-metallic base material. As used herein, such a metallic particle refers to a discrete unit of material of indeterminate shape or size, which may include, for example, a powder, filing, fiber, or the like. A magnetic domain is a collection of dipoles in the material with a common orientation (as shown in FIGS. 3A-4C, and described in further detail below). Magnetic Domains are typically very small in size, such that a single crystal grain or single metallic particle will typically contain many magnetic domains. All or most of the magnetic domains may be oriented in a particular direction for the metallic particle to exhibit the particular magnetic characteristic being modified.

In exemplary embodiments, the metallic particles in the feed material 202 may initially be unmagnetized in the base material prior to encoding, which allows the particle to be induced with, and retain, permanent magnetic characteristics (e.g., magnetic vector orientation and/or intensity) according to the encoding. It is understood that such "permanent magnetism" or "permanent magnetic characteristics" as used herein means that the magnetic characteristics of the material are intended to remain unchanged indefinitely (e.g., readable throughout the useful life of the object formed by such feed material 202), it being understood that such permanent magnetism can be reconfigured or changed in response to a magnetic field or by heating above the Curie temperature, for example. The Curie Temperature ($T_C$) is the temperature above which ferrimagnetic and ferromagnetic materials lose their permanent magnetic properties and behave like paramagnetic materials. Alternatively, in other exemplary embodiments, the particles contained in the feed material 202 may be magnetic particles having a current magnetization (e.g., magnetic vector orientation and/or intensity) prior to encoding, and the encoding process may be utilized to reconfigure or reorient the magnetic characteristic of the particle according to the encoding.

In exemplary embodiments, the metallic particles in the feed material 202 that contain the magnetic domains are ferromagnetic or ferrimagnetic materials. For example, a voxel of the feed material 202 may include one or more known ferromagnetic or ferrimagnetic materials (magnetized or unmagnetized), such as iron, nickel, cobalt, manganese, aluminum, rare earth metals, and their respective alloys, including their respective oxides, carbides, nitrides, sulfides and the like.

Ferromagnetic materials are strongly magnetic, and form strong permanent magnets which are attracted to the external magnetic field (positive magnetic susceptibility). Magnetic Susceptibility ($\chi$) relates to how strongly a material interacts with a magnetic field, in which positive susceptibility is aligned parallel to the applied magnetic field, and negative susceptibility is aligned anti-parallel to the magnetic field.

Figure 3A:
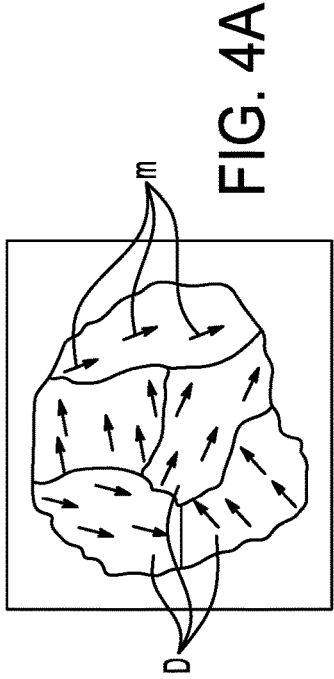
FIG. 3A illustrate a ferromagnetic material without exposure to an external magnetic field.
Figure 3B:
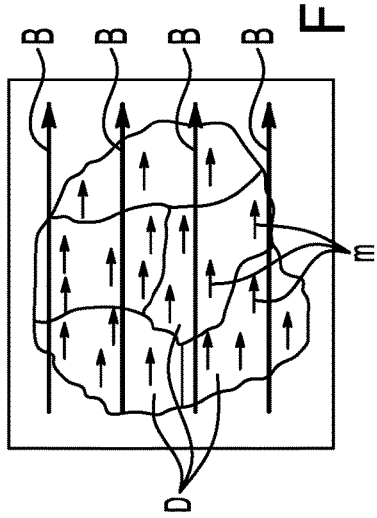
FIG. 3B illustrates the ferromagnetic material exposed to an external magnetic field.
Figure 3C:
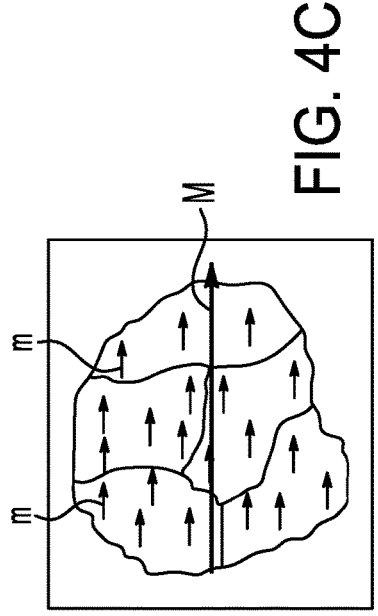
FIG. 3C illustrates the ferromagnetic material after exposure to the permanent magnetic field.

An example of a ferromagnetic particle is shown in the illustration of FIGS. 3A-3C, in which the dipoles of the material form zones that define magnetic domains ("D") which are composed of many atoms ($>10^{12}$). As shown in FIG. 3A, in the absence of an external magnetic field the dipoles tend to be randomly oriented, which is why ferromagnetic materials in nature have very weak net magnetic fields. As shown in FIG. 3B, however, the dipoles of a ferromagnetic material respond strongly to an external magnetic field (shown with vectors designated "B"), such that each magnetic domain D has magnetic moments ("m") that point in the same direction as the external magnetic field B and with an intensity that is proportional to the magnetic field B. As shown in FIG. 3C, after the external magnetic field B has been applied but is no longer present, the magnetic domains in the particles form a permanent magnetic field "M" that exhibits a permanent magnetic characteristic that corresponds to a magnetic vector orientation in the direction of the applied magnetic field B (from FIG. 3B) and/or with a magnetic vector intensity proportional to the applied magnetic field B. It is noted that when raised above the Curie Temperature ($T_C$), ferromagnetic materials undergo a magnetic state transition and become paramagnetic. By way of non-limiting examples, exemplary ferromagnetic materials may include one or more of the following (with Curie temperature, in K, in parenthesis): Co (1388), Fe (1043), MnBi (630), Ni (627), MnSb (587), $CrO_2$ (386), MnAs (318), Gd (292), Tb (219), Dy (88), EuO (69), or other similar ferromagnetic materials.

Figure 4A:
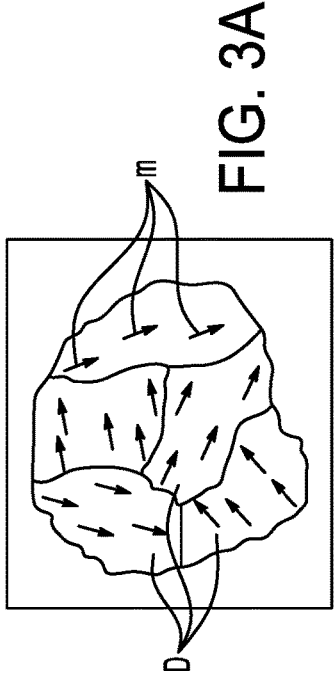
FIG. 4A illustrate a ferrimagnetic material without exposure to an external magnetic field.
Figure 4B:
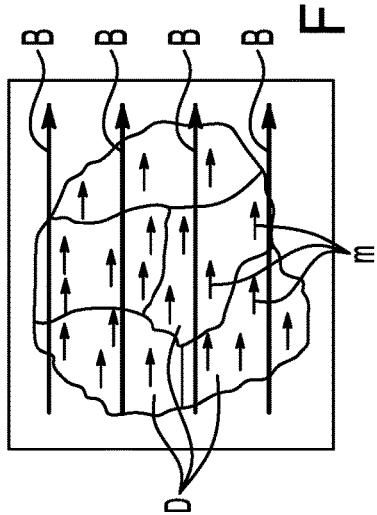
FIG. 4B illustrates the ferrimagnetic material exposed to an external magnetic field.
Figure 4C:
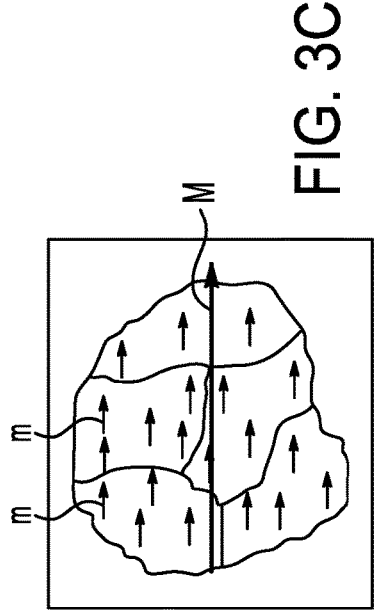
FIG. 4C illustrates the ferrimagnetic material after exposure to the permanent magnetic field.

Ferrimagnetic materials are similar to ferromagnetic materials. An example of a ferrimagnetic particle is shown in the illustrations of FIG. 4A-4C. Similarly to the foregoing, FIG. 4A shows the ferrimagnetic material in the absence of an external magnetic field in which the dipoles tend to be randomly oriented. FIG. 4B shows the ferrimagnetic material's response to an external magnetic field "B", such that each magnetic domain D has magnetic moments ("m") that point in the same direction as the external magnetic field B and with an intensity that is proportional to the magnetic field B. FIG. 4C shows the state of the ferrimagnetic material after the external magnetic field B has been applied, such the magnetic domains in the particles form a permanent magnetic field "M" that exhibits a permanent magnetic characteristic that corresponds to a magnetic vector orientation in the direction of the applied magnetic field B (from FIG. 4B) and/or with a magnetic vector intensity proportional to the applied magnetic field B. It is noted that ferrimagnetic materials exhibit a much weaker magnetization than ferromagnetic materials, which is attributed to its magnetic moments ("m") coupling in both parallel and anti-parallel orientations, which reduces the net magnetic moment. With both ferrimagnetic and ferromagnetic materials, the material can be permanently magnetized when below $T_C$ and is paramagnetic above $T_C$. When working with ferrimagnetic materials, another parameter of interest is the magnetization compensation point (MCP). The MCP is a temperature slightly below $T_C$ where the parallel and anti-parallel oriented modes balance, creating a net-zero magnetic moment in the material. Ferrimagnetic materials also have much higher resistivity than ferromagnetic materials, which may lend to various practical applications as would be understood by those having ordinary skill in the art. By way of non-limiting examples, exemplary ferrimagnetic materials may include one or more of the following (with Curie temperature, in K, in parenthesis): $Fe_2O_3$ (948), $\gamma Fe_2O_3$ (875), $Fe_3O_4$ (850), $FeOFe_2O_3$ (858), $NiOFe_2O_3$ (858), $CuOFe_2O_3$ (728), $MgOFe_2O_3$ (713), $MnOFe_2O_3$ (573), $Y_3Fe_5O_{12}$ (560), $Fe_3S_4$ (610), $Fe_7S_8$ (595), $\gamma FeOOH$ (455).

Generally, a magnetic material subjected to an external magnetic field (e.g., 210) will have induced magnetization roughly proportional to the magnetic field strength, as provided by Curie's Law (Eq. 1) and the Curie-Weiss Law (Eq. 2).

$$M = C \cdot \frac{B}{T} \quad \text{(Eq. 1)}$$

$$\chi = \frac{C}{T - T_C} \quad \text{(Eq. 2)}$$

where: M is the magnetization (magnetic moment/volume); C is the material specific Curie constant; B is the magnetic field, measured in Tesla; and T is the temperature, measured in Kelvin.

The process of inducing and retaining permanent magnetism in a material is statistical in nature, and is at least partially driven by the magnetic fields in a given item's environment. As shown in Eq. 1, for example, increasing the magnetic field strength is one way to increase the likelihood of an induced permanent magnetic field in the material. By the formulation of these laws, it is also clear that temperature has an effect on inducing permanent magnetism into an unmagnetized material. Specifically, as the temperature gets closer to $T_C$ the material becomes more susceptible to being magnetized. As the object cools the magnetic field has been locked in and the object is now magnetized.

Still referring to FIG. 2, in the illustrated embodiment, during the encoding of randomized information (e.g., randomized magnetic characteristics) into the feed material 202 with the magnetic field generator 212, the feed material 202 may be at an elevated temperature to enable softening of the material during drawing, but below the glass transition temperature to enable the material 202 to maintain its shape during the drawing. While the material 202 is at the elevated temperature, the magnetic field generator 212 generates the magnetic field 210 in a randomized direction and/or with a randomized intensity to expose the magnetic domains of the metallic particles in the base material to the external magnetic field 210. The impingement of the magnetic field 210 on the metallic particles in the respective regions (e.g., S1, S2, S3, S4) of material 202 causes the magnetic domains in the particles to form a permanent magnetic field (e.g., "M" in FIG. 3C and FIG. 4C) such that each segment (S1, S2, S3, S4, etc.) has a permanent magnetic characteristic (M1, M2, M3, M4) that corresponds to a magnetic vector orientation in the direction of the applied magnetic field 210 and/or with a magnetic vector intensity proportional to the applied magnetic field 210. For example, in the illustrated embodiment, the different segments S1, S2, S3, S4 of the feed material 202 are shown to have magnetic characteristics M1, M2, M3, M4 that correspond to the direction and/or intensity of the magnetic field 210 applied during the formation of that particular segment of the material. Upon cooling, the encoded magnetic characteristics M1, M2, M3, M4 of the segments S1, S2, S3, S4 remain permanently oriented in the direction of the magnetic field 210 applied at those regions, and the intensity of the encoded magnetic fields M1, M2, M3, M4 are proportional to the intensity of the external magnetic field 210 applied at those regions. The cooled feed material 202 may be fed into a spool or roll 216 (or other suitable form) for later additive manufacturing, as described in further detail below.

As noted in Equations (1) and (2) above, the elevated temperature of the feed material 202 provided by the heater 206 during the encoding may facilitate inducing the permanent magnetic characteristic M in the magnetic grains of the metallic particles at the different segments S of the material 202. Because in the illustrated embodiment the feed material 202 maintains its overall shape during drawing, the temperature is limited to below the Tg of the material. Accordingly, the intensity of the magnetic field 210 generated by the magnetic field generator 212 may be increased to account for this lower temperature. It is understood, however, that lower temperatures (e.g., room temperature) may be used, in which the intensity of the magnetic field 210 may need to be increased; or higher temperatures may be used (e.g., approaching or above Tg) in which less intensity of the magnetic field 210 may be needed. Preferably the external magnetic field 210 may be configured with an intensity that induces (or reconfigures) permanent magnetism in the magnetic domains of the respectively exposed metallic particles without causing movement of the metallic particles relative to the surrounding non-metallic base material (e.g., thermoplastic). Such an approach permits the magnetic encoding of the feed material 202 while minimizing distortion of the material which otherwise could occur if the metallic particles were caused to move through the non-metallic material matrix during processing. Such an approach also may reduce the occurrence of micro-fractures, bubbles, or more general superficial distortion of the desired shape.

Although shown in the illustrated embodiment with four configurations of the magnetic field characteristics M1, M2, M3, M4, it is understood that many different magnetic orientations and/or intensities are possible at the different segments of the feed material 202. More particularly, each voxel within the feed material 202 may be capable of being configured at many possible magnetic orientations and/or intensities. In this manner, the feed material can exhibit a wide range of bits of information (such as at least 1, 2, 4, 6, 8, 12, 14, 16 or more bits of information) based upon its magnetic vector orientation and/or magnetic vector intensity, in combination with the spatial location of the voxel in the feed material represented in three dimensions (x,y,z). This allows for a highly complex magnetic encoding of the randomized information. The resolution of such magnetic encoding may be based upon numerous factors, such as the size of the magnetic field 210 relative to the size of the feed material 202, the speed at which the magnetic field can be oriented relative to the speed of the material 202 through the field, the various degrees of rotation and/or various degrees of intensities of the magnetic field 210, and the material properties of the feed material 202, for example.

It is understood that although shown during an exemplary drawing process, the encoding of the feed material with randomized information may occur during any suitable process for any suitable material in any suitable way. For example, the filament of the feed material 202 may be formed during an extrusion process (e.g., screw feed extruder) in which the magnetic field may be applied during this process. In the illustrated embodiment, the magnetic field 210 may be applied upstream or further downstream of drawing through the die 208 for example. It is of course appreciated that other types of materials may be utilized depending on the additive manufacturing technique and/or application, as would be understood by those having ordinary skill in the art. For example, for some additive manufacturing techniques using metals, the feed material may be composed of a metallic base material in which the configurable magnetic domains may be formed by one or more metallic grains of the metallic base material. It is understood that magnetic encoding is one exemplary method of encoding the randomized information into the feed material, however other alternative forms of encoding are possible. It is furthermore understood that although randomized information is encoded in the feed material in the illustrated embodiment, in some exemplary embodiments intended fiducial information may be encoded into the feed material alternatively or additionally to the randomized information. For example, such intentionally encoded information may be encoded via the magnetic field generator and controller, or such intentional information may be encoded with "blank" spaces intentionally introduced into the feed material either via turning off the magnetic field, or by raising the temperature above the Curie temperature to "erase" the permanent magnetic characteristics of the material in those regions, for example.

Figure 6:
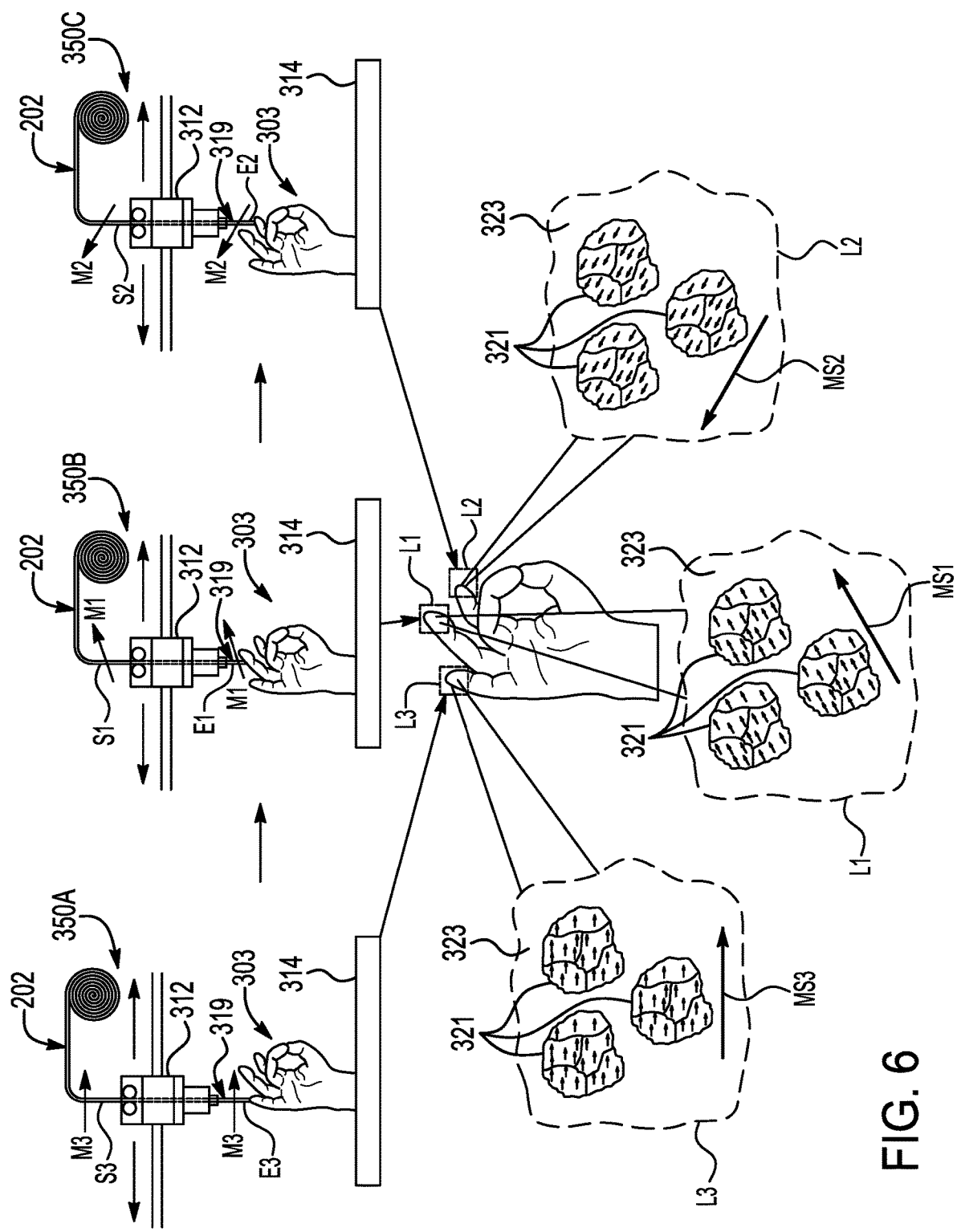
FIG. 6 illustrates various exemplary states of additively manufacturing a physical object using the additive manufacturing system in FIG. 5 and the feed material in FIG. 2, according to an embodiment of the present disclosure.

Turning now to FIGS. 5 and 6, with reference back to step 104 in FIG. 1, an exemplary system 300 and process 301 for additively manufacturing a physical object 303 with the feed material 202 encoded with the randomized information is shown in further detail.

Referring particularly to FIG. 5, an exemplary additive manufacturing system 300 is shown. In the illustrated embodiment, the additive manufacturing system 300 includes a fused deposition modelling apparatus 306 in which the feed material 202 from step 102 is provided. As shown, the feed material 202 is supplied via an input port 310 to an extrusion head 312 (also referred to as an extruder), which may be moveable in x,y,z coordinates relative to a build substrate 314 (e.g., build platform). The feed rate of the feed material 202 may be independently controlled by one or more actuators 316 for being supplied to the extrusion head 312 and out of an exit nozzle 318 of the extrusion head. The one or more actuators 316 may include motors, such as stepper motors, which may be selected in a suitable manner well-known in the art. The actuator(s) 316 may be independently controlled to convey the material 202 from the spool 216 from process 200 (or other suitable supply) through the input passage 310 and downstream toward the exit nozzle 318 with prescribed feed forces or feed rates that may be selected or adjusted depending on the system requirements.

As discussed above in the process 200, the feed material 202 is provided in solidified form (e.g., thermoplastic filament) and will have a plurality of different segments S1, S2, S3, etc. that have randomized magnetic characteristics M1, M2, M3, etc. With a thermoplastic-based material, the feed material 202 is thermally liquefiable by heating to a temperature above the glass transition temperature (Tg) of the material. As used herein, the term "liquefied," "liquefication" or the like includes heating to a temperature, or maintaining at a temperature, at which the material exhibits a flowable, viscous, or fluid state. Generally, a so-called "cold end" 302 of the additive manufacturing system 300 is where the solid filament feed material 202 is stored and drawn into the extruder 312. The so-called "hot end" 304 is where the filament feed material 202 is heated, pushed through the nozzle 318 as an extrusion material 319, and deposited onto the print bed 314 to build an object in "slices" (or layers). In the illustrated embodiment, the system 300 includes one or more heating elements 322 configured to heat and/or liquefy the feed material 202 as it enters the extruder 312.

Upon liquefying the feed material 202 in the extruder 312, the material still will maintain the permanent magnetic characteristics M1, M2, M3 of the randomized encoding provided the temperature does not exceed the Curie Temperature (Tc) of the magnetized metallic particles contained in the material. Because the shape of the material 202 changes during such liquefication and subsequent extrusion through the nozzle 318 (typically with a much smaller size than the original filament diameter), there may be some slight modification to the encoded randomized information relative to the exact location along the filament. Nevertheless, because the magnetic characteristics M1, M2, M3 are maintained during the extrusion at approximately the same spatial locations of the feed material, the segments of extrusion material (E1, E2, E3) that exit the nozzle 318 will have respective magnetic characteristics M1, M2, M3 that correspond with the segments S1, S2, S3 of the feed material that passed through the extruder 312.

As shown, the extruded material segments (E1, E2, E3, etc.) having the magnetic characteristics (M1, M2, M3, etc.) are deposited in a layer-wise fashion on the build platform 314 and are cooled to a non-flowable state. The build platform 314 and/or the extruder 312 may be movable relative to a frame of the apparatus via X, Y, and Z drives in a well-known manner. The deposited material is then built up in this fashion, layer-by-layer, to form the three-dimensional object 303 (as shown in FIG. 6, for example).

Generally, the information for creating the object 303 will be included in a model for the object and/or fabrication instructions for the object. An object model may be any computer-readable file or files that collectively specify the structure, materials, and/or colors of the object. This may, for example include CAD files, STL files, and the like that provide three-dimensional descriptions of the object. Fabrication instructions corresponding to a model may be any collection of instructions that, when carried out by an additive manufacturing apparatus or three-dimensional printer, result in the fabrication of the object. For example, fabrication instructions may include a series of instructions for moving to various x,y,z coordinates, extruding build material, controlling temperature, feed rate, etc. In a typical additive manufacturing system, the user designs an object in three-dimensional (3D) Computer Aided Design (CAD) software. The resulting file is then processed through a "slicer," a tool which creates instructions for the 3D printer (AM apparatus) to print the object. The slicer takes the material type, the printer type and configuration, the nominal extrusion temperatures, feed rate, and other details into consideration when creating the file to print an object.

To carry out instructions for producing the three-dimensional object 303, the system 300 also includes a controller 326 that is operably coupled to one or more other parts of the system, such as the actuators 316 and the heating elements 322, for example. The controller 326 also may receive feedback from sensors or other devices for verifying and adjusting the control of such parameters. For example, the controller 326 is operably coupled to the actuators 316 for independently controlling the feed rate or feed force of the feed materials 202 through the extruder 312. The controller 326 also is operably coupled to the one or more heating elements 322 for independently controlling the temperature of the feed material 202. In this manner, the controller 326 may control the temperature in the extruder 312 to above the Tg of the thermoplastic base material to ensure flowability, but below the Tc of the metallic material to ensure no erasure of the encoded magnetic characteristics. However, in some embodiments, the controller 326 may increase the temperature to above the Tc of the magnetized material to purposefully erase such magnetic encoding, thereby providing intentional "blank" regions (without magnetic characteristic) in the object 303 amongst the randomized information.

FIG. 6 shows various states of additively manufacturing the physical object 303 with the feed material 202 that is encoded with randomized information (e.g., randomized magnetic characteristics). In the illustrated embodiment, the different states of forming the object 303 are shown 350A, 350B, and 350C, which represent different time intervals at which different portions L1, L2, and L3 of the object 303 (e.g. pinky finger, ring finger and forefinger, respectively) are formed with different segments S1, S2, S3 of the feed material 202.

Because the feed material 202, and thus the extrusion material 319, are encoded with randomized information, the various portions of the physical object 303 that are formed with the material 319 will exhibit respective randomized signatures based upon at least some of the randomized information that was encoded in the feed material 202. More particularly, in the illustrated embodiment the randomized information is characterized by randomized magnetic characteristics M1, M2, M3 encoded at the different segments S1, S2, S3 of the feed material (and thus the different segments of the extrusion material E1, E2, E3) via the magnetized particles in the material from process 200. For example, as shown in the illustrated embodiment, the magnetized (e.g., metallic) particles 321 in the thermoplastic matrix 323 have randomized magnetic characteristics at different segments of the material based upon the randomized encoding from process 200. This results in locations L1, L2, L3 of the object 303 that are formed with those segments of material exhibiting respective randomized magnetic signatures MS1, MS2, MS3 based at least partially upon the randomized magnetic characteristics M1, M2, and M3 of the feed material 202.

By additively manufacturing the object 303 in this way, at least part of the object 303, or the entirety of the object 303, may be characterized by a spatial array of randomized information in the form of randomized magnetic signatures MS1, MS2, MS3 at the different portions L1, L2, L3 of the object. These randomized magnetic signatures MS1, MS2, MS3 exhibit magnetic fields with different magnetic vector orientations and/or different magnetic vector intensities based upon the randomized encoding. Because of the randomness of these magnetic fields, on a macro scale the magnetic fields will appear to cancel each other out based on Gaussian statistics such that the object 303 as a whole exhibits a net zero magnetic field. However, when evaluating the smaller portions of the object (e.g., L1, L2, L3), the corresponding randomized magnetic signatures MS1, MS2, MS3 will reveal themselves in the form of their respective magnetic vector orientations and/or magnetic vector intensities. These magnetic signatures MS1, MS2, MS3 at the respective locations of the object 303 may thereby be used to form a unique profile of the object 303, like a fingerprint, that can be used for authentication of the object 303.

Because the magnetic vector direction and/or intensity of each voxel in the object 303 is randomly assigned, the object 303 is capable of exhibiting a great deal of information based upon the spatial location of the voxel in three dimensions (x,y,z) in combination with the magnetic signature at that location. The amount of information may depend on the resolution of the encoding in the material, the resolution of the 3D printing, the capabilities of the decoder, among other considerations. By providing each voxel with an enhanced amount of information in this way allows the encoding of the information to be performed at a high-level, which may provide a significant advantage over typical binary encoding, such as 1-dimensional (e.g., barcode-like) or 2-dimensional (e.g., QR code-like) encoded information. Moreover, such magnetic encoding will not affect the visual or ornamental characteristics of the object, unlike like traditional bar codes. In addition, because the object as a whole may exhibit a net zero magnetic field by virtue of the randomness of the magnetic fields, such magnetically encoded information may be essentially invisible to standardized detection.

Figure 7:
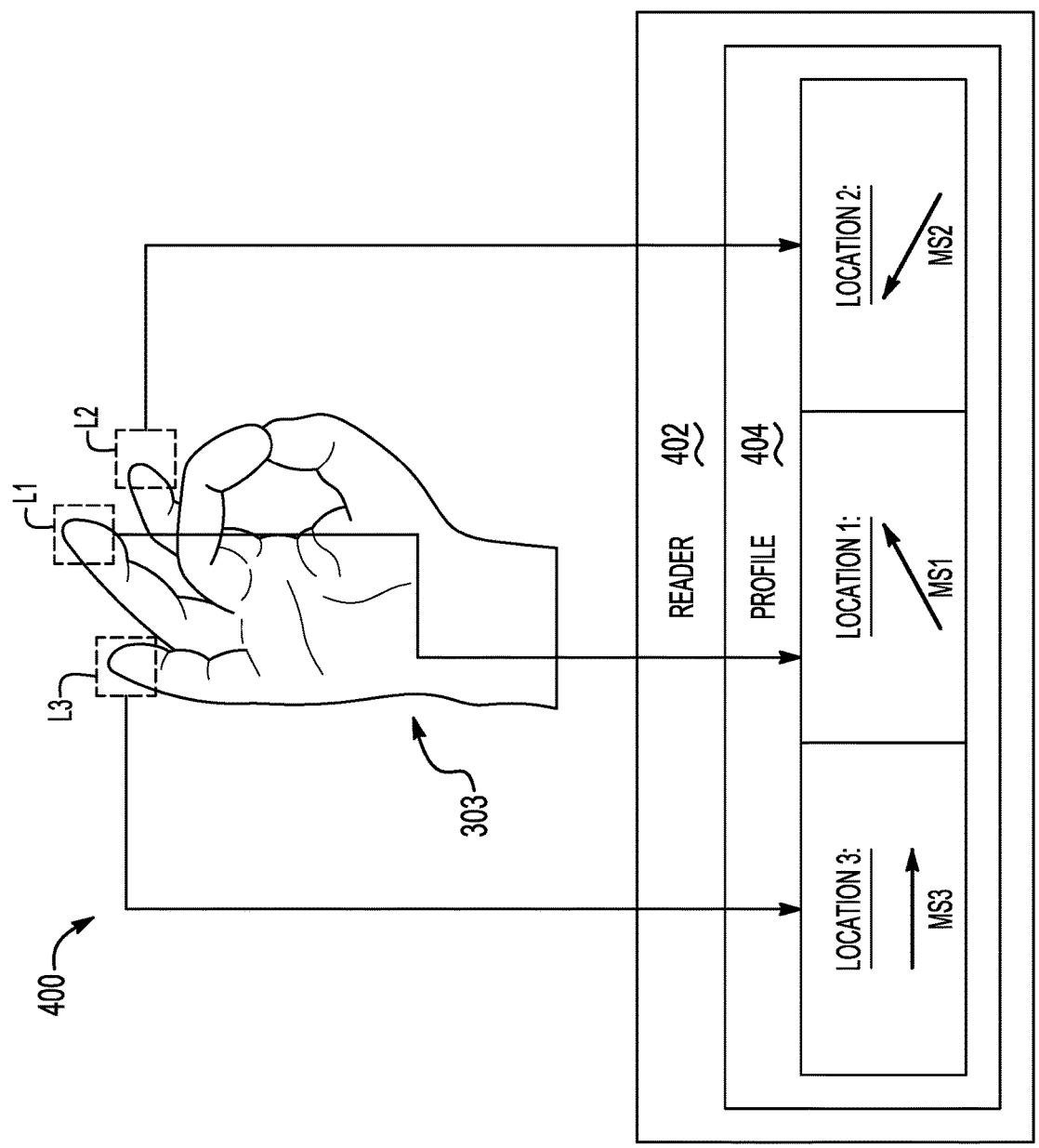
FIG. 7 illustrates an exemplary process for reading and profiling the physical object formed in FIG. 6, according to an embodiment of the present disclosure.

Turning to FIG. 7, and referring to step 106 in FIG. 1, a process 400 of reading and profiling the object 303 is shown. As shown, the process 400 includes reading at least some of the respective randomized signatures (e.g., MS1, MS2, MS3) at one or portions of the object (e.g., L1, L2, L3) using a suitable reader 402. In exemplary embodiments, the magnetic signatures MS1, MS2, MS3 in the object 303 may be read by any suitable reader, such as a magnetometer that is capable of reading and mapping the orientation and location (in one, two or three dimensions) of the various voxels having different magnetic characteristics for decoding the information. For example, the magnetic field vectors ($\Theta,\Phi,\rho$) may be measured with the magnetometer at locations (x,y,z) of the object. As discussed above, a voxel may be considered the smallest container for information which may hold one or more scalar values depending on the characteristics being measured. It is noted that a voxel of the object (e.g., formed via additive manufacturing or other processing) may be different in size and/or shape from the voxel of the reading device. Because a voxel is read at a particular x,y,z location by the reader, the voxel value may be considered the net effect of local fields at that spatial coordinate. Based upon at least some of the information from the reading, a profile 404 is created of at least some of the respective randomized signatures (e.g., MS1, MS2, MS3) at the one or more portions of the object (e.g., L1, L2, L3). The profile 404 may be created by recording the readings. In exemplary embodiments, the profile 404 may be stored in the reader 402 or an external storage medium (local or remote), such as a non-transitory computer-readable medium, for example a magnetic, optical or semiconductor storage device.

Referring back to step 124 in FIG. 1, after the object 303 has been produced and the profile 404 has been created, the physical object 303 may be transported to an authenticator and the data of the profile 404 may be transmitted to the authenticator. The authenticator may be a downstream third-party, such as a distributor of the object 303, or the authenticator may be an intermediate-user or end-user of the object 303, such as a customer, for example.

Figure 8:
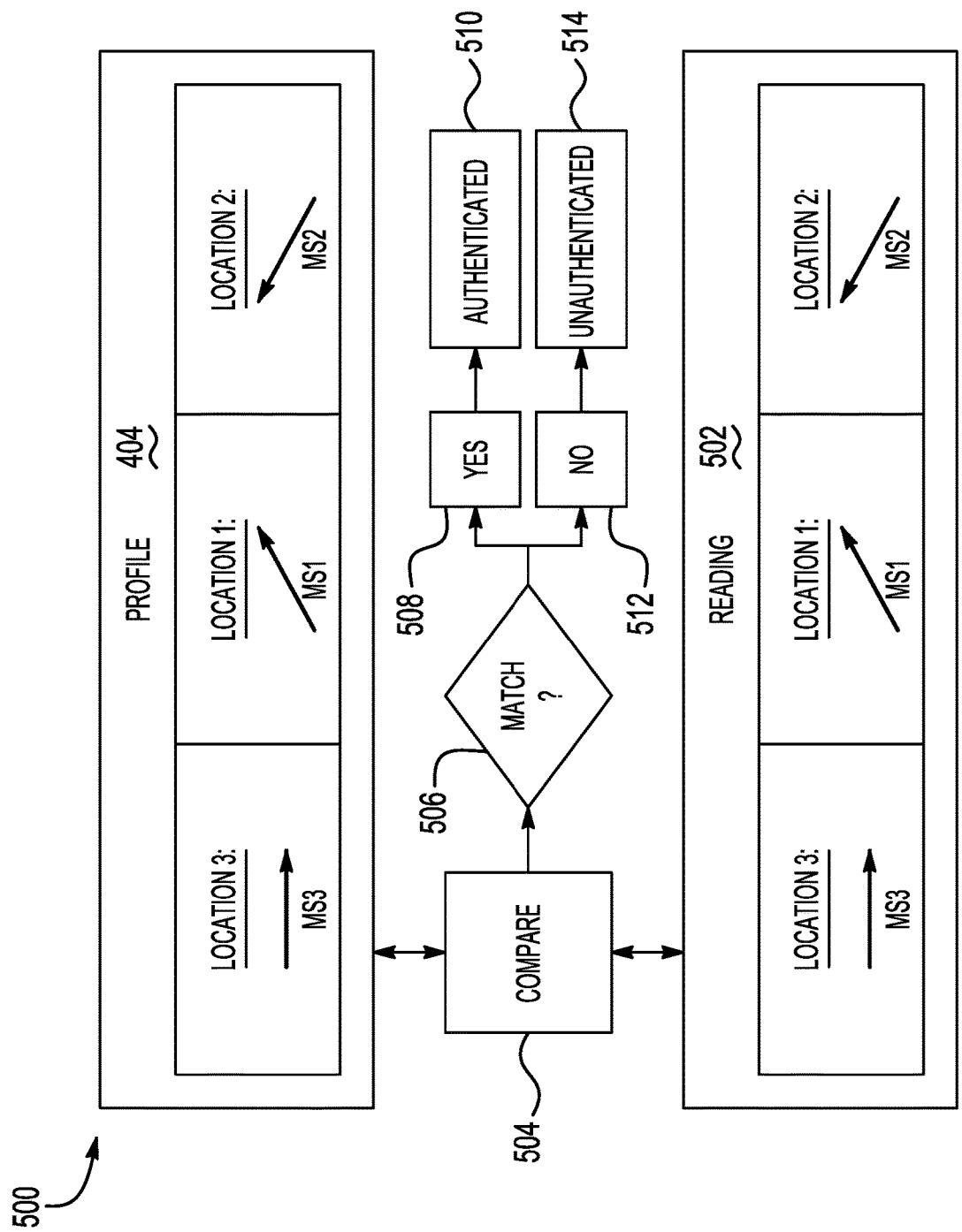
FIG. 8 illustrates an exemplary method of authenticating the physical object formed in FIG. 6 and profiled in FIG. 7, according to an embodiment of the present disclosure.

Turning to FIG. 8, and referring back to step 108 in FIG. 1, an exemplary method 500 of authenticating the object 303 by the authenticator is shown in further detail. After receiving the object 303, the authenticator will create a reading 502 by reading the respective randomized signatures (e.g., MS1, MS2, MS3) at the respective portions of the object (e.g., L1, L2, L3) using a suitable reader, similarly to the process 400. The reading 502 may be stored on a suitable storage medium (e.g., local or remote electronic storage device) to create a local profile to be used to compare to the profile 404 that was transmitted in step 124. After receiving the transmitted profile 404 and performing the readings, the authenticator will compare the reading 502 to the profile 404, as shown at step 504 (corresponding to step 128 in FIG. 1). At step 506, the authenticator will determine if there is a sufficient match based upon the comparison. If the authenticator determines in step 506 that there is a sufficient match (step 508), then the object 303 may be accepted as authenticated (step 510). If the authenticator determines in step 506 that there is not a sufficient match (step 512), then the object 303 may be rejected as un-authenticated (step 514), thus indicating that the object 303 has been tampered with or counterfeited, for example.

An exemplary system and method for authenticating an object has been describe herein, which may include one or more steps of: (1) encoding a feed material with randomized information; (2) forming the physical object with the feed material such that one or more portions of the physical object have respective randomized signatures based upon at least some of the randomized information of the feed material; (3) reading the respective randomized signatures at the one or portions of the object; (4) creating a profile of the respective randomized signatures at the one or more portions of the object based upon information from the reading; (5) transporting the physical object to an authenticator, and transmitting the profile to the authenticator; (6) reading the respective randomized signatures at the one or more portions of the object by the authenticator; and (7) comparing the reading by the authenticator to the profile received by the authenticator to thereby authenticate the physical object. As described above, in exemplary embodiments, the randomized information in the feed material may include randomized magnetic characteristics encoded at different portions of the feed material. Accordingly, the respective randomized signatures of the object may include respective randomized magnetic signatures based upon at least some of the randomized magnetic characteristics of the feed material.

Although an exemplary feed material in the form of a thermoplastic-based filament containing magnetic or magnetizable particles for forming the object via fused filament fabrication has been described herein, it is understood that other suitable forms of feed material and additive manufacturing techniques may be employed using the principles and aspects of the present disclosure, as would be understood by those having ordinary skill in the art. For example, additive manufacturing (AM) has many forms, including, for example, stereolithography (SLA), powder bed fusion (PBF), direct metal deposition (DMD), fused filament fabrication (FFF), and the like. Each method has a range of materials which can be utilized successfully. It is also understood that metallic-based feed materials also could be used in accordance with the principles and aspects described herein, for example by encoding the magnetic domains of such metallic-based materials. By way of non-limiting examples, the process(es) by which such metallic-based materials can be additively manufactured include, for example: material jetting, powder bed fusion (e.g., direct metal laser sintering, electron beam melting, selective laser melting or selective laser sintering), laminated-based techniques (e.g., laminated object manufacturing), direct energy deposition (e.g., laser engineered net shaping, direct metal deposition), etc. It is understood that the foregoing process(es) may be performed during the formation of a new object or during the modification of an existing object. It is furthermore understood that the encoding of the magnetic domains may include inducing permanent magnetization into such domains that were not previously magnetic, or may include reconfiguring the magnetic orientation of such domains that were previously permanently magnetic, as noted above.

It is understood that embodiments of the subject matter described in the present disclosure can be implemented in combination with digital electronic circuitry, controllers, processors, computer software, firmware, and/or hardware. For example, embodiments may be implemented in manufacturing equipment, such as an additive manufacturing system or other processing apparatus, that use one or more modules of computer program instructions encoded on a non-transitory computer-readable medium for execution by, or to control the operation of, data processing apparatus.

In the flow diagram(s), blocks may denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Algorithmic descriptions and representations used herein are the means used by those skilled in the art to convey the substance of their work to others. An algorithm or method is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

The controller(s) described herein may include all apparatus, devices, and machines for processing data, including by way of example a programmable processor, a computer, or multiple processors or computers. The controller may include a primary control circuit that is configured to carry out various control operations. The control circuit may include an electronic processor, such as a central processing unit (CPU), microcontroller or microprocessor. Among their functions, to implement the features according to the present disclosure, the control circuit and/or electronic processor may comprise an electronic controller that may execute program code. It will be apparent to a person having ordinary skill in the art of computer programming, and specifically in application programming for electronic and communication devices, how to program the device to operate and carry out logical functions associated with the particular application. Accordingly, details as to specific programming code have been left out for the sake of brevity.

The computer program (also referred to as software or code), may be deployed in any form, including as a stand-alone program or as a module, component, subroutine, or other unit suitable for use in a computing environment. It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method.

Devices suitable for storing computer program instructions and data include all forms of non-volatile memory, media and memory devices, including by way of example semiconductor memory devices. For example, the program may be stored in a non-transitory computer readable medium, such as random access memory (RAM), a read-only memory (ROM), an erasable programmable read-only memory (EPROM or Flash memory), or any other suitable medium. In exemplary embodiments, the control program is stored internally within the processing components, but the program also may be stored in an additional memory device. Instructions for performing the methods described herein that are stored in the non-transitory computer readable medium may be executed by the controller or suitable processor. Also, while the code may be executed by control circuit or processor in accordance with an exemplary embodiment, such controller functionality could also be carried out via dedicated hardware, firmware, software, or combinations thereof.

As used herein, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

It is to be understood that unless specifically stated otherwise, references to "a," "an," and/or "the" may include one or more than one, and that reference to an item in the singular may also include the item in the plural. The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of producing an authenticatable physical object, comprising:
   encoding a feed material by subjecting the feed material to an external magnetic field, wherein the subjecting includes randomly orienting the direction of the magnetic field and/or randomly altering the intensity of the magnetic field to thereby impart a randomized magnetic characteristic at different portions of the feed material;
   feeding the feed material including the different portions having the randomized magnetic characteristic into an additive manufacturing machine; and
   additively manufacturing the authenticatable physical object with the feed material such that respective portions of the authenticatable physical object have respective randomized signatures based at least in part upon the randomized magnetic characteristic at the different portions of the feed material;
   wherein the feed material includes a base material having metallic particles contained therein, and wherein the subjecting the feed material to the external magnetic field causes the respective metallic particles to form permanent magnetic characteristics corresponding to the direction of the magnetic field and/or in proportion to the intensity of the magnetic field.

2. The method according to claim 1, wherein the feed material is a filament.

3. The method according to claim 2, wherein the filament includes a magnetized material.

4. The method according to claim 3,
wherein the magnetized material is included along a length of the filament, and
wherein the magnetized material at respective different portions along the length of the filament have randomized magnetic field directions and/or intensities.

5. The method according to claim 3, wherein the filament includes base material that contains the magnetized material therein.

6. The method according to claim 5, wherein the base material includes a thermoplastic, and wherein the magnetized material includes metal particles dispersed within the thermoplastic.

7. The method according to claim 1, wherein the additive manufacturing includes depositing the feed material while maintaining at least some of the randomized magnetic characteristics of the feed material that are present after the encoding and before the additive manufacturing.

8. The method according to claim 1, wherein the additive manufacturing includes heating the feed material to a heated temperature before the depositing.

9. The method according to claim 8, wherein the heated temperature is above a glass transition temperature of a base material of the feed material, and is below a Curie temperature of magnetized material in the base material that is encoded with randomized magnetic characteristics.

10. The method according to claim 9, wherein during at least some of the additive manufacturing, the heating is increased such that the heated temperature is above the Curie temperature of the magnetized material to thereby cause the magnetized material to lose the randomized magnetic characteristics, such that one or more portions of the physical object are intentionally devoid of a magnetic signature.

11. The method according to claim 9, wherein the additive manufacturing includes fused filament fabrication, including the steps:
conveying the feed material with an actuator to an extruder,
heating the feed material in the extruder,
extruding the feed material through a nozzle of the extruder, and
depositing the feed material on a substrate.

12. The method according to claim 1, wherein the physical object as a whole formed by the additive manufacturing has a net zero magnetic field.

* * * * *